United States Patent [19]

Henderson

[11] 3,820,822
[45] June 28, 1974

[54] TOW HITCH
[76] Inventor: Charles R. Henderson, 255 W. 1st South, Vernal, Utah 84078
[22] Filed: May 29, 1973
[21] Appl. No.: 364,944

[52] U.S. Cl............................................. 280/478 A
[51] Int. Cl.............................................. B60d 1/00
[58] Field of Search......... 280/478 A, 478 B, 478 R

[56] References Cited
UNITED STATES PATENTS

| | | | |
|---|---|---|---|
| 3,093,395 | 6/1963 | Boutwell | 280/478 A |
| 3,126,210 | 3/1964 | Hill | 280/478 A |
| 3,410,577 | 11/1968 | Luinstra | 280/478 A |
| 3,521,908 | 7/1970 | Carter | 280/478 B |
| 3,622,182 | 11/1971 | Grosse-Rhode | 280/478 A |
| 3,774,943 | 11/1973 | Schmiesing | 280/478 B |

*Primary Examiner*—Leo Friaglia
*Attorney, Agent, or Firm*—Kay S. Cornaby

[57] ABSTRACT

A two hitch adapted to be extended longitudinally and laterally for attachment conveniently to a towing vehicle which is not in linear alignment with the hitch, has a pair of elongate bars extending horizontally in the same plane having respective mutually confronting longitudinal surfaces. The surfaces are pivotally connected together by pivot means which is mounted for sliding along at least one of the mutually confronting surfaces, and by a pair of cooperating scissor hinges, each extending laterally from respective sides of the elongate members. One end of each hinge is pivotally connected to one of the elongate members, and the other end of each hinge is pivotally connected to the other elongate member. The hitch has appropriate retaining and securing means at each end thereof for preventing the relative lateral movement of the elongate bars when the tow hitch is in use. Means are also provided at opposite ends of the two elongate bars for securing the respective hitch ends to a trailer or the like and to a towing vehicle.

10 Claims, 7 Drawing Figures

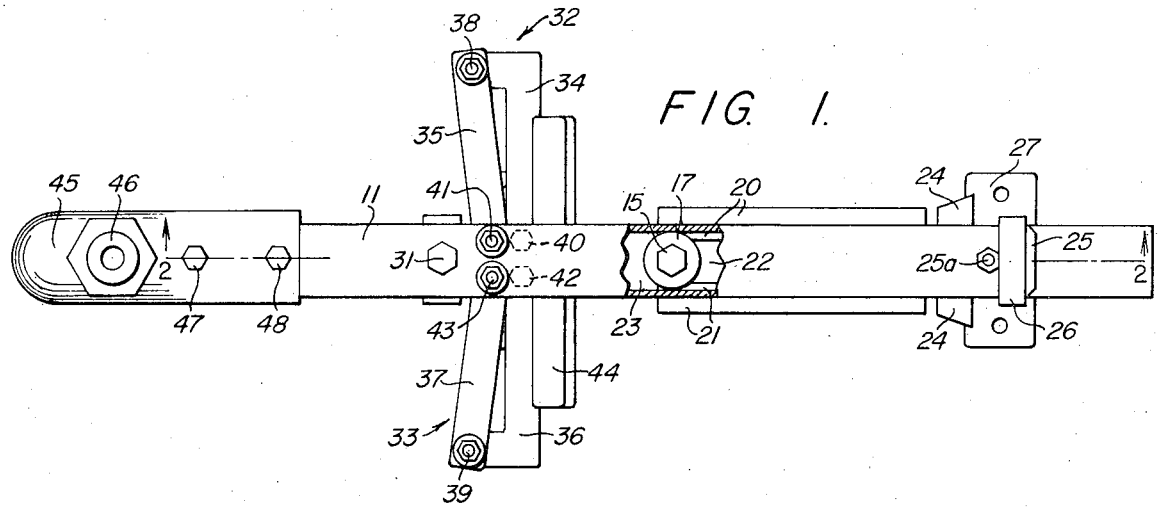
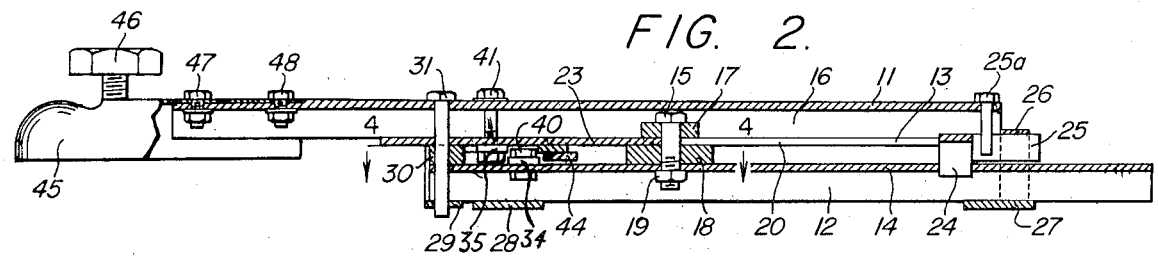
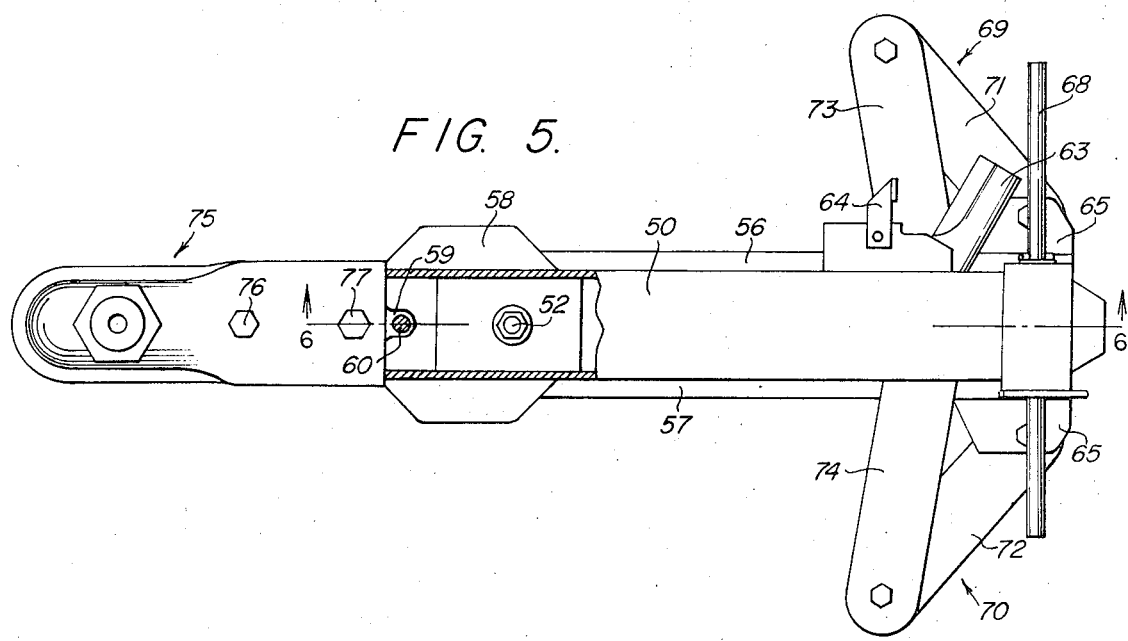

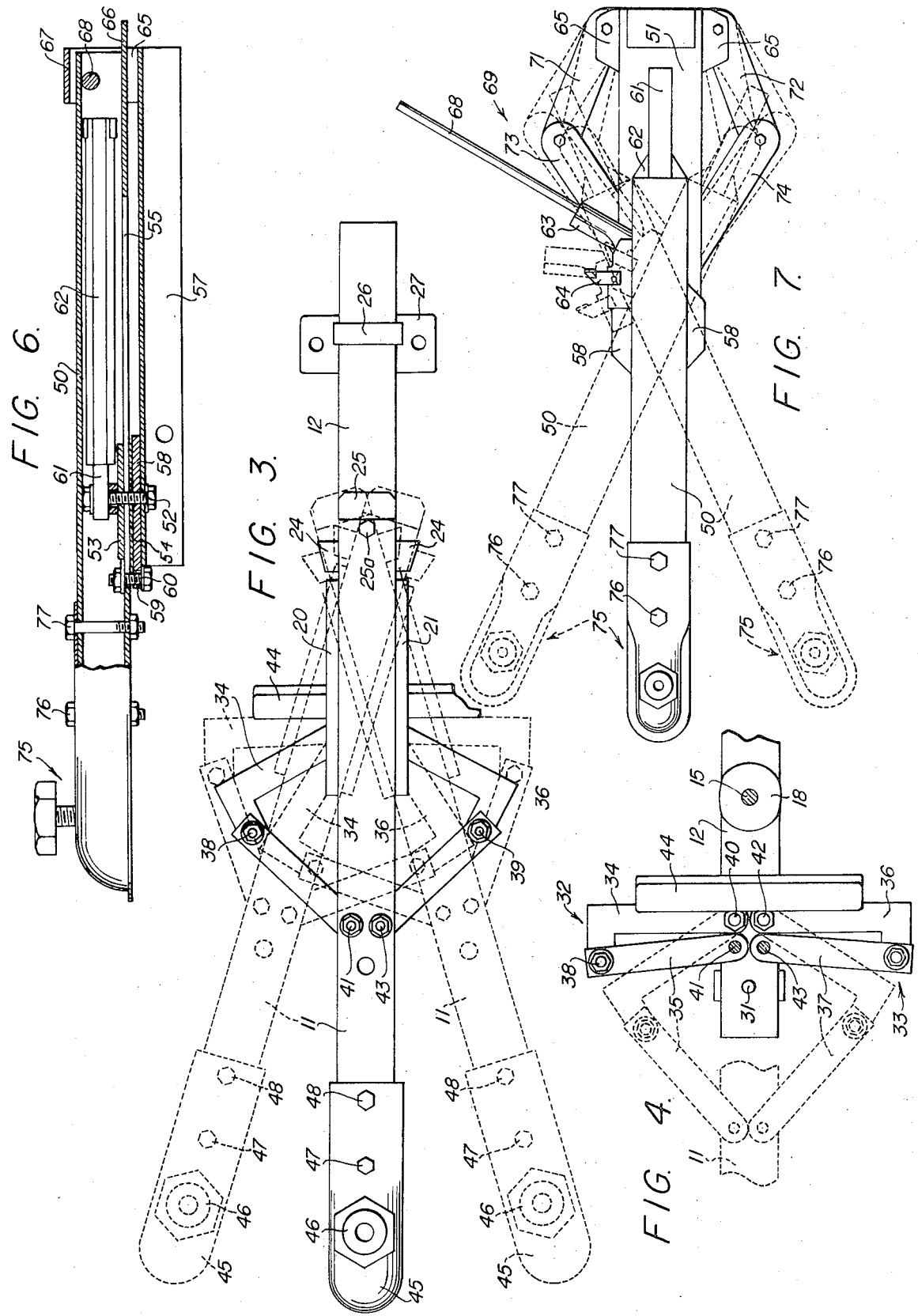

TOW HITCH

BACKGROUND OF THE INVENTION

This invention relates to the field of tow hitches for trailers and the like which can be towed by towing vehicles.

Although tow hitches generally have been known for many years and numerous improvements have bee made in the hitches to achieve a variety of objectives, one major problem has remained heretofore unsolved. Prior to the making of this invention, it was necessary in the art to align the bumper hitch attaching means of the towing vehicle precisely with the attachment means of the hitch on the tongue of the trailer, so that the hitch could be connected to the vehicle without having to move the often very heavy trailer into both longitudinal and lateral alignment with the towing vehicle after the vehicle had been initially "spotted" or backed into approximate position. As a practical matter heretofore, it has been necessary to have the towing vehicle back and pull forward several times before the vehicle was precisely spotted so that the trailer did not have to be moved to connect the hitch means.

It is noteworthy that the severity of the problem has caused many attempts to solve it in a variety of ways, not the least of which has been an attempt to provide adjustable hitch tongues which would permit the tow hitch to be longitudinally extended, but only to reach a towing vehicle that was in direct alignment with the trailer tongue and hitch. Unsuccessful attempts have been made heretofore to provide a commercially feasible hitch which would provide both longitudinal and lateral motion without moving the trailer. However, these attempts have been unable to provide both longitudinal and lateral movement in a smooth, continuous manner without elaborate, expensive internal mechanisms which are prone to break down easily under the hard use to which they are subjected. The earlier attempts have concentrated primarily on providing longitudinal and lateral movement of the hitch attachment means as two separate functions or movements, i.e., the hitch tongue could be extended longitudinally to a desired distance, then laterally to the desired point for attachment, but the hitch means could not be moved both longitudinally and laterally at the same time.

The stated objective of simultaneously providing both longitudinal and lateral movement of a tow hitch is achieved in the present invention as will more fully appear hereinafter.

SUMMARY OF THE INVENTION

The tow hitch of the invention has the capability of being simultaneously moved longitudinally and laterally to reach the hitch means of connection on a towing vehicle. The hitch comprises a pair of elongate members which may be in the form of steel bars having an inverted U-shaped cross section. The elongate members are disposed horizontally with respect to their longitudinal axes, one over the other, and have respective cooperating longitudinal surfaces lying in the same horizontal plane in mutually confronting relationship. Disposed between the mutually confronting surfaces is a pivoting means adapted to provide for pivoting of one member with respect to the other. The pivoting means also is slideably mounted on at least one of the survaces to provide for longitudinal sliding movement of one elongate member with respect to the other.

A pair of scissor hinges are disposed respectively on either side, laterally, of the elongate members. One end of each hinge is pivotally attached to one of the elongate members, and the other ends of the hinges are pivotally attached to the other elongate member, preferably on the mutually confronting surfaces of the elongate members, so that one member can be moved laterally with respect to the other member within the limits of the hinge capacity.

Appropriate means are included at opposite ends of respective members for attaching one end of one member, usually the lower member, to the trailer or other towable object; and the other end of the upper member to the towing vehicle. If desired, the position of the attaching means can be reversed with respect to each member.

The combination of pivoting means and scissor hinges provides for convenient placement of one elongate member relative to the other member in both a longitudinal direction and a lateral or rotating direction for placing the attaching means at the hitch connection means on the towing vehicle.

Additional elements of the hitch include retaining means and securing means, preferably located at or near the ends of the members, for holding the members in longitudinal alignment with each other when the hitch is being used for towing. A jack, such as an automotive bumper jack, can be attached to the elongate members to aid in applying sufficient force to pull the members into longitudinal alignment in the closed position with the hitch being attached to the towing vehicle. Guide means attached to one of the elongate members can also be employed to restrict the relative lateral movement of the other elongate member when the member is in the extended position.

THE DRAWINGS

Preferred embodiments of the invention are illustrated in the accompanying drawings, in which:

FIG. 1 is a top plan view of a hitch of the invention shown in the closed position;

FIG. 2 is an elevational section taken along Line 2—2 of FIG. 1;

FIG. 3 is a top plan view of the hitch shown in FIG. 1 in the extended position with the lateral positions of the upper member shown in dotted lines;

FIG. 4 is a top plan sectional taken along the Line 4—4 of FIG. 2;

FIG. 5 is a top plan view of an alternative embodiment of the invention shown in closed position;

FIG. 6 is an elevational section taken along the Line 6—6 of FIG. 5; and

FIG. 7 is a top plan view of the hitch shown in FIG. 5 in extended position showing the lateral positions of the upper member in dotted lines.

DETAILED DESCRIPTION OF THE ILLUSTRATED EMBODIMENTS

As shown in FIGS. 1–4, a preferred embodiment of the tow hitch has a pair of elongate members 11, 12 in the form of steel bars having inverse U-shaped cross sections. The inverse U-shaped cross sections of both bars open downwardly with bar 11 disposed above bar 12. Both bars 11, 12 extend horizontally along their longitudinal axes and have respective cooperating surfaces 13, 14 in a mutually confronting relationship.

Pivoting means in this embodiment take the form of a bolt 15 extending downwardly from the interior 16 of U-shaped bar 11 through a washer 17, a larger pivot washer 18, and through an aperture in the upper surface 14 of lower bar 12, which bolt 15 is pivotally secured by a nut 19. Washer 17 slidingly rests on the metal flanges 20, 21 welded to either side of the lower surface 13 of upper bar 11. The interior edges of flanges 20, 21 form an open longitudinal keyway 22 along which bolt 15 and washers 17, 18 can slide as upper bar 11 is extended longitudinally along lower bar 12. Pivot washer 18 rests on the upper surface 14 of lower bar 12 and supports flanges 20, 21 and bar 11 with its upper surface. Although pivot bolt 15 is not horizontally moveable with respect to lower bar 12, bolt 15 is pivotable with respect thereto. The movement of bolt 15 within keyway 22 is limited at either end respectively by a plate 23 welded to the lower surface 13 of bar 11 and by guide means 24 welded to the lower surface 13 of bar 11 near the end thereof. Guide means 24 in this embodiment comprises a laterally extending bar having downwardly curving portions at each end thereof to prevent upper bar 11 from pivoting laterally beyond a predetermined distance which is reached when the curved portions strike either lateral side of lower bar 12, depending upon which direction upper bar 11 is pivoted.

Adjacent to guide means 24 at the rear of the hitch is a first spacer block 25 which is bolted to the lower surface 13 of upper bar 11 with a bolt assembly 25a, and extends horizontally beyond the end of bar 11 to form a shelf for insertion into a metal strap or keeper 26. Strap 26 is secured to lower bar 12 and functions to hold spacer block 25 from lateral movement when block 25 is in position within the strap. In this manner, upper bar 11 is prevented from lateral movement after the hitch has been secured to a towing vehicle. Immediately below spacer block 25 a metal plate 27 with appropriate apertures therein is welded to the lower surface of bar 12, and is adapted to be used to secure with bolts or the like the lower bar to a trailer tongue. A similar plate 28 is found near the opposite end of bar 12 and is intended to be secured to the forward end of a trailer tongue.

An additional keeper or metal strap 29 is attached to upper bar 11 near the end of bar 12 when the hitch is in the closed position, and is adapted to hold the end of bar 12 securely in place when bar 12 is placed therein. At that point between the two mutually confronting surfaces 13, 14 of bars 11, 12, a second spacer block 30 is disposed and is attached by welding to plate 23. Spacer block 30 maintains a pre-determined distance between the two bar surfaces and permits bar 12 to slide into and out of strap 29. As a sure means of securing the two bars together to prevent both lateral and longitudinal movement when the hitch is in the closed position, a bolt 31 is provided for placement in a series of cooperating apertures extending through the horizontal surfaces of bars 11, 12, spacer 30 and strap 29.

Near the end of bar 12 and above plate 28, a pair of scissors hinges 32, 33 are disposed. Each hinge 32, 33 has two elongate hinge extensions 34, 35 and 36, 37 respectively. One end of each extension 34, 35 and 36, 37 is respectively pivotally joined together at points 38, 39 and extend laterally on either side of bars 11, 12. In this embodiment, hinge extensions 34 and 36 are right-angled to permit extensions 35 and 37 to rest adjacent to the other extensions, when the hitch is in the closed position. The opposite ends of hinge extensions 34, 35 are pivotally attached by means of bolt and nut assemblies 40, 41 respectively to the upper surface 14 of bar 12 and to plate 23 welded to bar 11. The opposite ends of hinge extensions 36, 37 are also respectively pivotally attached by means of bolt assemblies 42, 43 to the upper surface 14 of bar 12 and plate 23 on the lower surface of bar 11. A stop plate 44 against which scissors hinges 32, 33 rest when in the closed position to prevent further travel is welded to the lower surface 13 of bar 11.

In this embodiment, the securing means for attaching the hitch to the towing vehicle is the socket 45 of a simple ball and socket hitching mechanism. A bolt 46 is provided therein to secure the ball (not shown) within the socket, and the socket 45 is secured to the leading end of bar 11 with two bolt and nut assemblies 47, 48.

As shown in FIG. 3, bar 11 can be longitudinally extended along bar 12 and can be laterally adjusted, as shown by the dotted lines, to place socket 45 at any point within the arc subscribed by the movement of the bar 11.

A second preferred embodiment is depicted in FIGS. 5–7 of the attached drawing and has the scissors hinges located at the rearward end of the hitch. In this embodiment, the two elongate bars 50, 51 are pivotally attached to each other by a bolt and nut assembly 52. Pivoting assembly 52 has a pair of washers 53, 54 on which upper bar 50 slides along the upper surface of lower bar 51 through keyway 55 flanked by flanges 56, 57 extending along the lower surface of upper bar 50. Also attached to bar 51 surrounding pivoting assembly 52 is a hexagonally shaped metal plate 58 with a detent 59 in the leading edge thereof. A second bolt assembly 60 is secured to bar 50 and extends downwardly to engage detent 59 to secure bar 50 relative to bar 51 when the hitch is in the closed position.

The serrated metal shaft 61 of a jack 62 is also pivotally attached at the end thereof to bolt assembly 52 so that the shaft 61 remains pivotally stationary with respect to bar 51. Jack 62, which can be of the automotive bumper jack design, is fixedly secured to the interior of bar 50 and has a handle assembly 63 for actuation of the jack by hand. A securing lock 64 is also provided for the jack which can be set to render the handle assembly inoperative. Jack 62, or other means of applying force appropriately, such as a winch and cable, can be employed to force the bar 50 from its extended position to the closed position, and is particularly useful after the hitch has been attached to the towing vehicle to straighten the hitch and return it to its normally closed position.

At the rearward end of bar 51, a spacer block 65 separates the two bars 50, 51 and a plate 66 welded to the lower surface of bar 50 acts as a stop for the keyway 55. A metal strap or keeper 67 attached to the end of bar 51 provides a retainer for the end of bar 50 and prevents lateral movement of bar 50 when the hitch is in the closed position. As an additional security feature, the corresponding ends of bar 50 and strap 67 have cooperating apertures adapted to accept and retain a rod 68, which can also function as the jack handle for jack 62.

The pair of scissor hinges 69, 70 in this embodiment respectively extend laterally from either side of bars 50, 51, and are pivotally attached at the rearward ends of bars 50, 51. Spacer block 65 also functions as the achor plate for the pivotal attachment of respective hinge extensions 71, 72 to lower bar 51. The hinge extensions 73, 74 are attached pivotally to upper bar 50, and can share the same pivot point of attachment, if desired. The hinges function in the same manner as the scissors hinges described in the foregoing FIGS. 1–4. The actuation of the hinges 69, 70 is depicted for this embodiment in FIG. 7, with lateral positions of the bar 50 and hinges 69, 70 shown in dotted lines.

Socket means 75, or other appropriate attaching means, for attaching bar 50 to a towing vehicle is secured to the forward end of bar 50 by a pair of bolt and nut assemblies 76, 77.

Whereas this invention is herein illustrated and described with respect to preferred forms and embodiments, it is to be understood that many variations are permitted within the scope of the invention concept as set forth in the claims.

I claim:

1. Tow hitch adapted for longitudinal and lateral adjustment during coupling thereof, comprising in combination:
   a pair of elongate, horizontally extending members having respective cooperating longitudinal surfaces lying in the same horizontal plane in mutually confronting relationship;
   pivoting means pivotally connecting the mutually confront-surfaces of the elongate members, said pivoting means being slideably mounted for longitudinal movement between pre-determined points on the surfaces;
   a pair of mutually opposing scissor hinges respectively extending laterally from either side of the elongate members with one end of each hinge pivotally attached to a first elongate member and the other respective hinge ends being pivotally attached to a second elongate member;
   retaining means fixedly attached to the first elongate member near one end thereof and adapted to secure the corresponding end of the second elongate member from lateral movement;
   securing means attached to the elongate members adapted to prevent longitudinal movement of the elongate members with respect to each other;
   means at one end of the first elongate member for securing the hitch to an object to be towed; and
   means for removeably attaching the hitch to a towing vehicle, said means being disposed at the end of the second elongate member opposite the end of the first member bearing the securing means for securing the hitch to an object to be towed.

2. Tow hitch as set forth in claim 1, including guide means attached to one of the elongate members and adapted to restrict within pre-determined limits the lateral movement of the other elongate member relative to the first member.

3. Tow hitch as set forth in claim 1, including retaining means attached to the second elongate member near one end thereof and adapted to fixedly hold the corresponding end of the first elongate member.

4. Tow hitch as set forth in claim 1, wherein the first elongate member has a jack secured thereto with the jack extension bar attached at one end thereof to the second elongate member, said jack adapted to provide for drawing and end of the second member from an extended position into the retaining means of the first co-operating member.

5. Tow hitch as set forth in claim 1, wherein the retaining means and the securing means are of unified construction.

6. Tow hitch as set forth in claim 1, wherein the ends of the pair of scissor hinges which are pivotally attached to the first elongate member share a common pivot, and the hinge ends of the scissor hinges which are attached to the second elongate member also share a common pivot.

7. To hitch as set forth in claim 1, wherein the second elongate member has a plate attached thereto for resting the scissor hinges against when the hitch is in a closed position for towing.

8. Tow hitch as set forth in claim 1, wherein the pivoting means is fixedly mounted on the first elongate member and adapted to slideably move along the cooperating surface of the second elongate member.

9. Tow hitch as set forth in claim 1, wherein the pair of scissors hinges are disposed between the pivoting means and the means at the end of the end of the second elongate member for removeably attaching the hitch to a towing vehicle.

10. Tow hitch as set forth in claim 1, wherein the pair of scissor hinges are disposed between the pivoting means and the means at the end of the first elongate member for securing the hitch to an object to be towed.

* * * * *